United States Patent [19]

Sizmann

[11] Patent Number: 4,461,339
[45] Date of Patent: Jul. 24, 1984

[54] METHOD FOR INCREASING THE TEMPERATURE OF GASEOUS INERT CARRIER MEDIUM ON TAKING USEFUL HEAT FROM A STORAGE MEDIUM STORING HEAT BY WATER SORPTION

[75] Inventor: Rudolf Sizmann, Munich, Fed. Rep. of Germany

[73] Assignee: Didier-Werke A.G., Wiesbaden, Fed. Rep. of Germany

[21] Appl. No.: 402,327

[22] Filed: Jul. 27, 1982

[30] Foreign Application Priority Data

Aug. 3, 1981 [DE] Fed. Rep. of Germany ....... 3130671

[51] Int. Cl.³ ............................................. F28D 21/00
[52] U.S. Cl. ................................... 165/1; 165/104.12; 62/480
[58] Field of Search ................. 165/104.12, 1; 62/480

[56] References Cited

U.S. PATENT DOCUMENTS 4,272,268 6/1981 Greiner ................................. 62/480
4,403,643 9/1983 Minto ............................. 165/104.12

Primary Examiner—Albert W. Davis, Jr.
Attorney, Agent, or Firm—Wenderoth, Lind & Ponack

[57] ABSTRACT

The temperature of a gaseous inert carrier medium is increased by taking useful heat from a heat storage medium functioning by water sorption. Such a heat storage medium may be a solid sorption material such as a zeolite and silica gel and more specially molecular sieve material or fine-pored silica gel. The residual heat of the carrier medium is used, after the useful heat has been given up, for increasing the temperature of water, which at a higher temperature, is used for completely or generally completely humidifying such carrier medium and increasing the temperature thereof before it is run into the storage medium. The method is specially to be used on taking or extracting useful heat from the storage medium in cold seasons and for example on frosty days.

7 Claims, 3 Drawing Figures

METHOD FOR INCREASING THE TEMPERATURE OF GASEOUS INERT CARRIER MEDIUM ON TAKING USEFUL HEAT FROM A STORAGE MEDIUM STORING HEAT BY WATER SORPTION

GENERAL FIELD OF THE INVENTION AND DESCRIPTION OF PRIOR ART

The present invention relates to a method for increasing the temperature of a gaseous inert carrier medium by taking useful heat from a storage medium storing heat by water sorption.

A prior art suggestion has been made for the accumulation of energy from the environment using a storage medium based on water sorption so that, when needed, the storage medium may be caused to give up its energy. Such energy from the environment may more specially be solar radiation, see a paper in Solar Energy, 23 (1979), pages 489–495, in which the heat of adsorption of moisture on zolite molecular sieves is used. Further examples for storage mediums are silica gel and $CaCl_2$ or, furthermore, lithium chloride, lithium bromide solution and sulfuric acid.

In such cases, in which the solid storage mediums are named "sorption agents", general and special equations for the storage systems are:

$$AB + heat \rightleftarrows A + B$$

(examples for separate systems):

$$LiCl \cdot 3H_2O(solid) \rightleftarrows LiCl(solid) + 3H_2O(gas)$$
$$H_2SO_4 \cdot rH_2O(liquid) \rightleftarrows H_2SO_4 \cdot (r-n)H_2O(liquid) + n \cdot H_2O(gas)$$
$$sorption\ agents \cdot H_2O(solid) \rightleftarrows sorption\ agents(solid) + H_2O(gas)$$

On taking or extracting useful heat from such a storage medium functioning by sorption of water, the medium, free of water or with a lower level of water therein, is acted upon by air which is as moist as possible, and because of the absorption of the amount of water vapor in this supplied air by the storage medium, heat is given up to the gaseous, inert carrier medium and the temperature thereof increased. This gaseous inert carrier medium, which is then at a higher temperature level, may then give up useful heat therein in a heat exchanger, as for example a heating system.

The useful effect of such storage medium functioning by water sorption is that the energy therein may be stored as long as may be desired under the condition that access of water to the storage medium is not possible. Such access may however readily be stopped if the energy-charged, that is to say generally or completely dry storage medium, is sealed off from the atmosphere, that is to say against the access of moist air, or the access of water vapor, in a shut-off system, something readily possible in such plant in which the storage medium is normally stored in containers. Then, as it is needed, the useful heat may be taken from the storage medium by the addition of moist air thereto; to take an example the storage medium may be energetically charged in summer, or at any time that dry air is on hand, so that such dry storage medium may be kept in sealed columns in an energetically charged condition till the cold season comes and then the storage medium may be made to give up its useful heat for heating purposes by running moist carrier medium thereinto.

It has now been seen from experience that on taking useful heat from such an energy-charged, that is to say dry, storage medium by the addition of moist air in a cold season, and more specially on cold winter days, at which time the useful heat produced has to be at a specially high temperature level, the supply of moist air to the charged storage medium does not give the high desired temperature level of for example 60° C. as would in fact be desired of the operation of normal radiator heating. The reason for this is that for causing the charged storage medium to give up its useful heat, use is normally made of air from the environment, for example in the form of air aspirated from the soil. Using such air from the soil gives, more specially in a cold season and on frosty days, a useful effect and may even be necessary, because air with the necessary degree of moisture and at the right temperature is not on hand for running into the storage medium. However it has been seen from tests that even on cold winter days air may be aspirated from the frost-free layers of soil with the right degree of permeability (and which if desired may have been got ready artificially by using a layer of gravel) and such input air (for input to the storage medium) on average has a temperature of 10° C. and a relative humidity of 80 to 100%.

On the input of such air at 10° C. and 100% relative humidity into a dry, that is to say energy-charged, silica gel as a storage medium, an increase in temperature of 30° K. may be produced so that in other words the useful heat coming from such storage medium is at a temperature level of about 40° C. However, as we have seen, on cold days on which a specially high temperature level is desired, or for other purposes such as heating water to be used in a building, such a temperature is not high enough.

In an earlier, so far unpublished suggestion made in the prior art, see U.S. Ser. No. 272,525 filed June 11, 1981 by the same inventor, for increasing the temperature level of the useful heat further, post-humidifying was to be undertaken, see the account of operation as detailed in FIGS. 4 and 5 of this earlier patent application.

SUMMARY OF THE INVENTION

One purpose of the present invention is that of making possible a still better way of undertaking later or post humidifying as noted in the above patent application and making possible a further increase in the temperature level of the useful heat taken from the storage medium.

For effecting this purpose, and further purposes, use is made of the method of the present invention which is characterized in that residual heat of the carrier medium is made use of, after taking up the useful heat for increasing the temperature of water and in that this water is used for at least generally completely humidifying the carrier medium and increasing the temperature thereof before it is run into the storage medium.

As part of a preferred form of the invention, air is used as the carrier medium.

As part of a still further preferred form of the invention, a method is undertaken with silica gel as the storage medium, the method then turning out to give a specially good effect. Such effect is furthermore produced by using a zeolite as a storage medium.

As part of a further preferred form of the invention, the saturation of the carrier medium with water is undertaken in a counter-current manner in a trickle tower,

BRIEF DESCRIPTION OF THE DRAWINGS

Details of the invention will now be given with reference to the accompanying drawings, wherein.

DETAILED DESCRIPTION OF THE INVENTION

Figure 1:
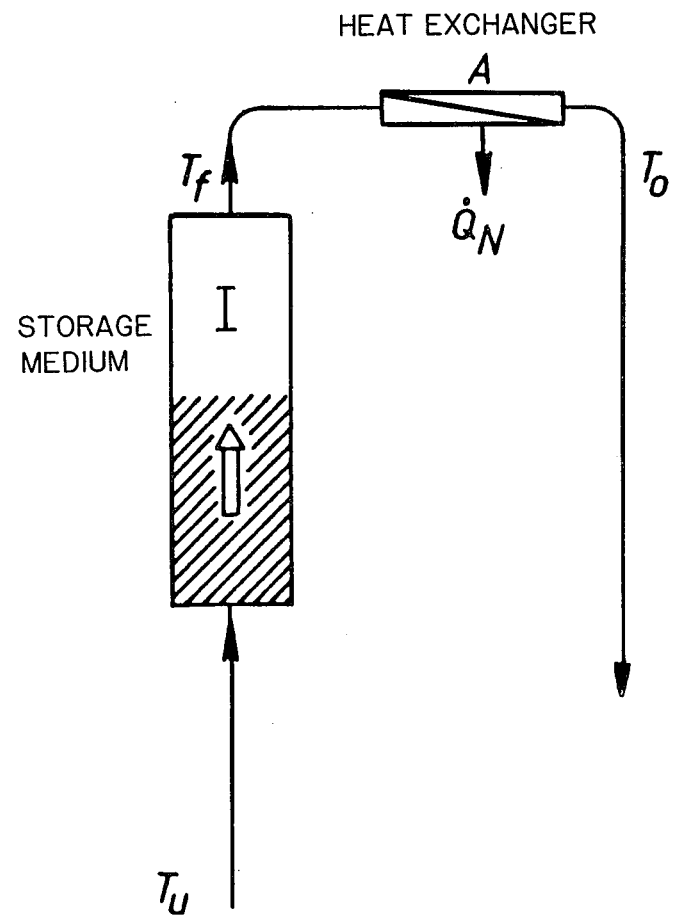
FIG. 1 is a diagrammatic view of a known plant for taking or extracting useful heat from a storage medium making use of moist air from the environment.

In FIG. 1 is shown a plant for undertaking a known method which in the shaded part of the column I there is storage medium after giving up its energy and at a higher level there is storage medium which is still energy-charged, that is to say dry, such storage medium being fine-pored silica gel. Moist input air with a temperature ($T_u$) of 10° C. and a relative humidity ($\mu$) of 100% is moved in and taken up by the storage medium I. Such input or supplied air may readily be taken from an air permeable soil layer, possibly having water trickling therethrough, such layer being out of the way of the effects of frost. On adiabatic operation of the method dry air will make its way out of the top part of the column charged with storage medium I, because the moisture of the input air has been completely absorbed in the dry, fine-pored silica gel. The temperature level ($T_f$) of such air coming out of the column measured was seen to be 39° C. In the heat exchanger A, the next part of the apparatus, useful heat $\dot{Q}_N$ may be obtained from this air (as a gaseous inert carrier medium) at 39° C., the temperature ($T_o$) of the air coming out of the heat exchanger A being lower, that is to say 30° C. Useful heat $\dot{Q}_N$ with a temperature level of, at the most, 39° C. may be used for heating purposes or for producing hot water.

Figure 2:
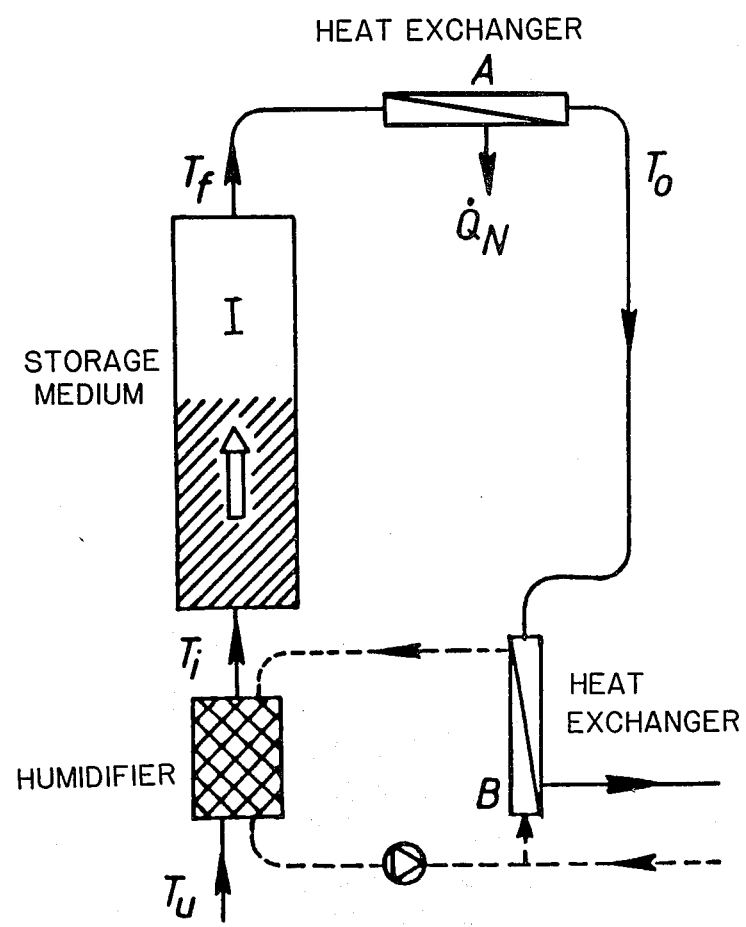
FIG. 2 is a diagrammatic view of a plant for undertaking the method of the present invention with an open-circuit system and in which there is a post-humidifying of the supplied or input air.

In the method of the invention, see FIG. 2, the air $T_o$ to coming from the heat exchanger A and still at a higher temperature is run through a second heat exchanger B in which the residual heat of the air at 30° C. is given up to and taken up by water which is circulated through heat exchanger B and may take on a greatest possible temperature of 19° C. This water at a higher temperature is run into the top part of a humidifier whose output is joined up with the input of the column with the storage medium I, such water being used for increasing the temperature of the input air, supplied at the lower part of the humidifier, and for completely or generally completely humidifying such air, that is to say producing, as far as possible, a value of 100% for the relative humidity $\mu$. The cooled water coming out of the lower part of the humidifier is then run back into the lower part of the heat exchanger B in which it is moved in counter-current direction with the carrier medium, that is to say, in the present case, air. The water circuit naturally has to be kept topped up with water because of the loss of water, going on all the time in the humidifier, to the input air. Such a supply of water is possible by an automatically controlled feed system.

The humidifier is best designed as a trickle tower, although it is however possible to make use of a tower as a humidifier in which the water is forced through jets into the top part.

It is furthermore possible for the water moving in the circuit to be supplied by way of cleaning stages for clearing solid or gaseous material (as for example $SO_2$ in the input air or solids such as dust or soot taken up in the input air or moved along thereby), such material being taken up in the humidifier from the supplied input air. This water circuit may for this reason be used as a further cleaning stage for the supplied input air. In such a case it may be necessary for the water to be processed in this circuit. On operation of such a plant under the conditions named, that is to say with an input air temperature ($T_u$) of 10° C. and a relative humidity ($\mu_u$) of 100%, it has been seen from tests that the air coming from the humidifier had a temperature ($T_i$) of 17° C. and a relative humidity ($\mu_i$) of 100. When this air with temperature ($T_i$) of 17° C. and a humidity ($\mu_i$) of 100% is run into a storage column I full of dry, fine-pored silica gel, the temperature ($T_f$) at the outlet of the column of the storage medium I is 60° C., that is to say a temperature level for useful heat which is 21° K. higher. The temperature ($T_o$) of the air coming from the heat exchanger A is kept at 30° C., this air at 30° C. then being used in the heat exchanger B for heating up the water in the circuit. Such water is supplied to the top part of the humidifier.

A further useful effect produced by the method of the invention is that in the present case the silica gel may be charged so as to take up the greatest possible amount of water, whereas in the method of FIG. 1 charging the silica gel with water is only possible up to about 51%; that is to say only 51% of the amount of energy stored in the silica gel is able to be taken out or extracted again.

The method of the invention is such that it may more specially be used with silica gel as a storage medium, such gel being more specially fine-pored or medium-pored. A zeolite storage medium may, in the method of the invention, be a synthetic or a natural zeolite and more specially zeolites which have been put forward for use as molecular sieves.

The method of the invention may furthermore be run in an open or open-circuit system, in which case naturally only air may be used as a carrier medium.

Figure 3:
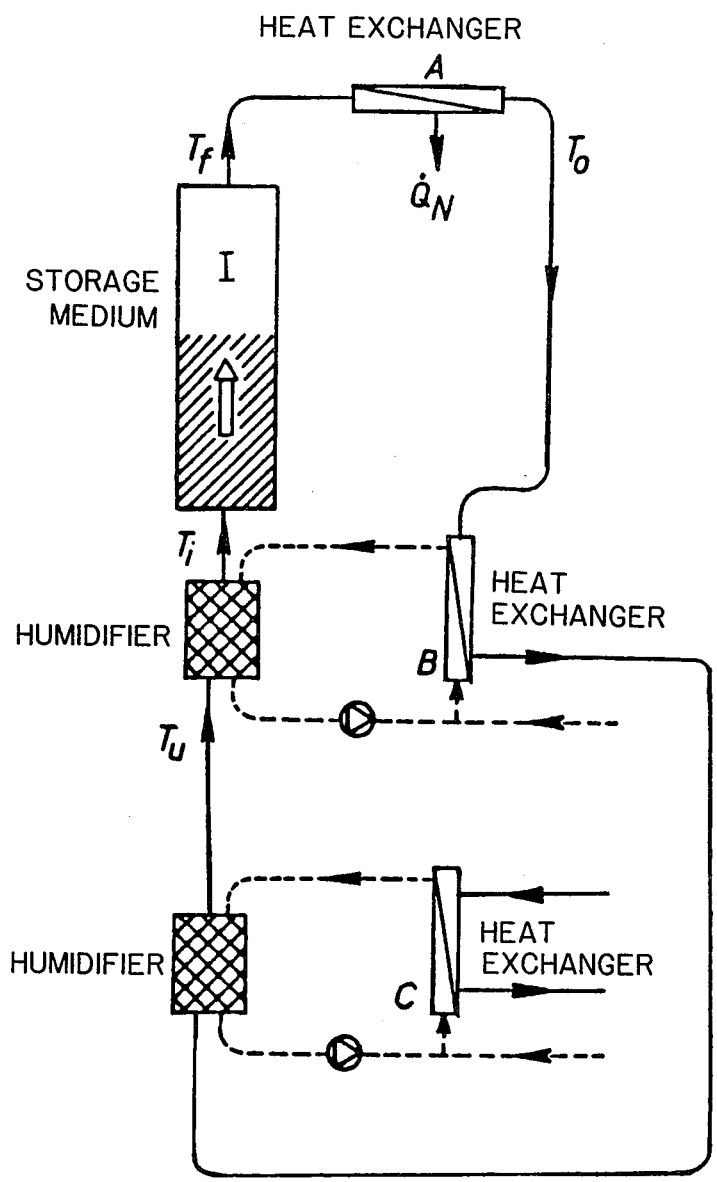
FIG. 3 is a diagrammatic view of a plant which, while being designed as well for undertaking the method of the present invention, makes use of a shutoff or closed circuit or system and in which, as well, post-humidifying is undertaken.

However there are furthermore cases in which the method of the invention is run as a closed or closed-circuit system, more specially when the air has to be processed because of having an overly great amount of damaging or undesired substances therein or because it is not possible, or is not possible to the desired degree, for moist air to be aspirated on cold days, or in winter, from the soil, because of the soil conditions not making this possible. In such a case of the air being charged with such undesired substances, the heat of the soil is transferred in a further heat exchanger C by way of a brine circuit (see FIG. 3) to the carrier medium of the closed-circuit system and the same is humidified by the input of water from the outside. This carrier medium then does not have to be in the form of air and it may in fact be in the form of an inert gas such as nitrogen, a noble gas or $CO_2$.

The necessary amount of heat for evaporation of the water supplied from the outside to the carrier medium has to be supplied from the anergy of the air supplied to the heat exchanger C or the energy is taken from the soil, for example by way of a brine circuit. In this case it is however normally as well only possible to get a temperature ($T_u$) of the supplied carrier medium of 10° C. at a greatest possible relative humidity ($\mu_u$) of 100% so that in fact the same temperatures at the input and output of the heat exchanger A would be produced as in the case of the method to be seen in FIG. 1. Using the method of the invention with the further humidifying stage (see FIG. 3) it is however generally possible to get the same temperatures as in the open system of FIG. 2, in which example the necessary amount of heat is supplied by way of a brine circuit from the soil. In the first humidifier the carrier medium is supplied with water vapour so as to be as saturated as possible, that is to say with a value equal to 100%, in the second humidifier the temperature is stepped up from $T_u$ to $T_i$ and at the same time, by the supply of water, the degree of saturation is kept at a value ($\mu$) of 100% or only a little thereunder. Like the second humidifier, the first humidifier may be in the form of trickle tower or another known apparatus.

I claim:

1. A method for increasing the temperature of a gaseous inert carrier medium, said method comprising:

passing a moist carrier medium through a storage medium storing heat by water sorption, and thereby drying and heating said carrier medium;

transferring residual heat from the thus dried and heated carrier medium to water after taking up the useful heat; and employing the thus heated water to humidify and increase the temperature of said moist carrier medium before the passage thereof through said storage medium.

2. A method as claimed in claim 1, wherein said carrier medium comprises air.

3. A method as claimed in claim 1, wherein said storage medium comprises silica gel.

4. A method as claimed in claim 2, wherein said storage medium comprises silica gel.

5. A method as claimed in claim 1, wherein said storage medium comprises zeolite.

6. A method as claimed in claim 2, wherein said storage medium comprises silica gel.

7. A method as claimed in claim 1, wherein said humidifying said carrier medium comprises passing said heated water counter-current to said carrier medium in a trickle tower.

* * * * *